United States Patent [19]

VanLingen

[11] 4,205,745
[45] Jun. 3, 1980

[54] CONVEYOR LOADING STATION

[75] Inventor: Eduard W. VanLingen, Littleton, Colo.

[73] Assignee: Robert L. Alldredge, Denver, Colo.

[21] Appl. No.: 958,008

[22] Filed: Nov. 6, 1978

[51] Int. Cl.² .................. B65G 15/40; B65G 47/16
[52] U.S. Cl. ................................ 198/703; 198/713; 198/715; 198/821; 198/838
[58] Field of Search .......... 198/547, 549, 654, 688, 198/695, 703, 707, 708, 713, 714, 715, 796, 820, 821, 822, 838, 831

[56] References Cited

U.S. PATENT DOCUMENTS

| | | | |
|---|---|---|---|
| 810,510 | 1/1906 | Robins | 198/688 |
| 1,446,308 | 2/1923 | Hurxthal | 198/708 |
| 2,701,050 | 2/1955 | Steinborn | 198/713 |
| 2,836,283 | 5/1958 | Horth | 198/831 X |
| 2,988,199 | 6/1961 | Pinkham | 198/654 X |
| 3,196,631 | 2/1965 | Knappe | 198/703 X |
| 3,342,310 | 9/1967 | Gray | 198/695 |
| 3,707,218 | 12/1972 | Payne et al. | 198/831 |
| 3,741,372 | 6/1973 | Hewitt | 198/707 X |
| 3,750,864 | 8/1973 | Nolte | 198/707 |
| 3,920,115 | 11/1975 | Craggs | 198/822 |
| 3,934,708 | 1/1978 | Kambara | 198/838 X |
| 4,019,625 | 4/1977 | Wiese | 198/708 |

*Primary Examiner*—James L. Rowland
*Attorney, Agent, or Firm*—Kyle W. Rost

[57] ABSTRACT

A flexible belt trough type conveyor is directed over a hump having an upwardly angling inclined side defined by belt supporting rails, then over a sprocket or similar rolling support device, and down the declined side of the hump on further rails. At the apex of the hump the belt is tensioned sufficiently to stretch the trough structures and partially or entirely flatten them, creating a loading station for granular materials such as explosives. When the belt has traveled over the apex, the tension decreases and the trough structure returns and automatically separates the granular material into discrete load units separated by the raised edges of the troughs.

9 Claims, 5 Drawing Figures

CONVEYOR LOADING STATION

BACKGROUND OF THE INVENTION

1. Field of the Invention

The invention relates to power driven conveyors of the type having a continuous rubber belt formed with convolutions separating the belt into individual compartments. Specifically, the invention is a loading station for such a conveyor belt wherein the convolutions of the belt are temporarily reduced in size or eliminated to facilitate the loading of granular material, particularly explosives.

2. Description of the Prior Art

Flexible conveyors capable of following a curved path have been known, as evidenced by U.S. Pat. No. 2,701,050 to Steinborn, which is the counterpart of an original German patent application. Later developments in such conveyor construction are seen in U.S. Pat. No. 2,836,283 to Horth and U.S. Pat. No. 3,169,631 to Knappe. Other patents related to such conveyors include U.S. Pat. No. 3,920,115 to Craggs and U.S. Pat. No. 3,707,218 to Payne. Conveyors manufactured in accordance with the above patents may be described as flexible, segmented trough belt conveyors wherein the belt on the conveyor consists of semi-rigid, reinforced corrugated rubber segments bolted together to form any belt length. Every fifth belt segment is bolted to a carriage that rides on rubber tires, and the tires are adapted to follow a track that defines the desired path for the conveyor. The carriages are connected to each other by a link chain, which in turn is driven to drive the entire conveyor.

As can be understood from the above description, the several carriages connected by link chain are capable of bending in curves or deforming in valleys or over peaks without difficulty. The corrugated nature of the belt enables it to stretch over peaks and compress in valleys, and stretch and compress as necessary on horizontal turns.

At the end of each run of the conveyor, the belt passes around an end sprocket and becomes inverted for the return trip to the start of the run. As the belt makes the required 180 degree inversion, the corrugations are known to be stretched almost to the point of total elimination, with the result that the belt is very close to being smooth. In the past, this point in the belt travel has offered the greatest opportunity to clean the belt by applying a scraper or other cleaning device to the belt surface, since the corrugations will not be present to disrupt the operation of the cleaning device.

The stretching of a belt passing around a sprocket has been employed in other arts for useful purposes. U.S. Pat. No. 3,741,372 to Hewett utilizes a belt with interior compartments that are closed when the belt is flat, but that have an external opening exposed when the belt is stretched, as when the belt is passing around an end pulley. Hewett uses the belt as a pick-up and discharge device wherein material is received at one end of the conveyor run and discharged at the opposite end. This same concept is found in other U.S. patents, including U.S. Pat. Nos. 810,510 to Robins; 2,988,199 to Pinkham; 3,342,310 to Gray; 3,750,864 to Nolte; and 4,019,625 to Wiese. It is known from these various teachings that the stretching of a belt at the end sprocket of a conveyor run will flatten corrugations or open interior cavities in the belt. This knowledge has been employed to fill or empty the cavities or to clean the belt at the end-of-run sprocket, as noted above.

The problem addressed in the present invention is that certain materials are dangerous and difficult to handle, particularly in those instances where the materials will be subjected to friction. One such material is explosive powder such as gun powder. When an explosive powder is to be loaded on a conveyor, it is desirable that the powder be accurately contained in such a way that none of the powder will spill. Any spillage may potentially fall into machinery where it could be accidentally ignited, or it may simply constitute a hazardous accumulation of dangerous material.

Another goal of powder transport is that the material be physically isolated in relatively small amounts so that if accidental ignition or explosion should occur, the loss may be confined.

An overall goal is that friction be minimized so that the powder is not exposed to conditions likely to cause ignition or explosion.

In the past, these objectives have not been addressed. The present invention employs a flexible conveyor belt plus suitable support structure to create a unique loading station for explosive powders wherein the powders are handled with a minimum of friction while achieving all of the above goals.

SUMMARY OF THE INVENTION

A conveyor of the kind having a flexible belt with crossfolds, convolutions, corrugations, or other physical relief structure on the outer, working surface thereof, serving to define material carrying open-topped compartments, is directed along a suitable supporting framework having a hump therein. The belt is of the kind, known in the art, that is capable of stretching and thereby reducing the elevations of the physical relief structure, and that is resilient enough to substantially restore the elevation of those structures when the stretching tension is reduced. The hump in the supporting framework deviates from the smooth path of the belt sufficiently to cause the belt to stretch and reduce the elevation of the relief structure, and while the belt is so stretched, an associated dispensing station deposits a carried material on the stretched portion of the belt. As the belt then travels off the hump, the relief structure returns to its greater elevation to naturally compartmentize the carried load.

The station preferably is employed with a conveyor of the kind having a corrugated belt with a link chain attached under the belt and spaced roller carriages also connected to the chain. The roller carriages guide the conveyor along rails that define a path, which may be curved horizontally or vertically as desired. The station itself is then created by angling the rails upwardly on one side of the hump and downwardly on the opposite side, wherein the hump has sufficient abruptness to cause the belt to stretch while passing over the apex, resulting in substantial flattening of the corrugations at the apex. A loaded material, such as an explosive in powder or flake form, is deposited on the flattened belt near the apex in a carefully metered amount such that there is no excess to spill off the belt, and as the belt descends from the hump, the corrugations are restored and naturally dish the load into discrete load units, each being of suitable size to be completely contained between the corrugations.

The primary object of the invention is to create a loading station for explosives where the explosive can be transported on a conveyor belt without spillage. Proper metering of the explosive from the dispenser onto the conveyor belt is accomplished in a continuous manner, but it is then critical that the explosive be contained on the belt without applying friction to the explosive. Therefore, it is unsuitable to use a squeegee or wiper to level the explosive into the compartments of the belt. This problem is overcome by flattening the convolutions of the belt at the loading station, and allowing the convolutions to rise thereafter, automatically separating the loaded material into the desired compartments.

Another object of the invention is to create a conveyor structure capable of flattening the convolutions of a rubber belt as described herein to any degree, with a flattening of up to 95% being desirable. For this purpose, a support framework has been created with a lead-in and lead-out track creating a hill or hump in the conveyor track. Between the two tracks in a sprocket or like rolling support device that raises the belt to the apex of the loading station, where the maximum belt stretching and correspondent flattening of convolutions takes place. The size of the sprocket and the configuration of the lead-in and lead-out track are coordinated in such a way that the belt undercarriage can leave the lead-in track, pass over the sprocket, and be guided into the lead-out track by the angle of the belt over the sprocket, without resulting in binding of the undercarriage with the track.

An important object is to lift the conveyor undercarriage out of its track and carry it over a sprocket or roller with a contact angle of up to 135 degrees, but at least 120 degrees, in order to properly stretch the belt convolutions and create the desired flatness for loading purposes.

BRIEF DESCRIPTION OF THE DRAWINGS

FIG. 5 is an elevation view of the sprocket wheel as seen in the direction of arrows 5—5 of FIG. 4.

DESCRIPTION OF THE PREFERRED EMBODIMENT

Figure 1:
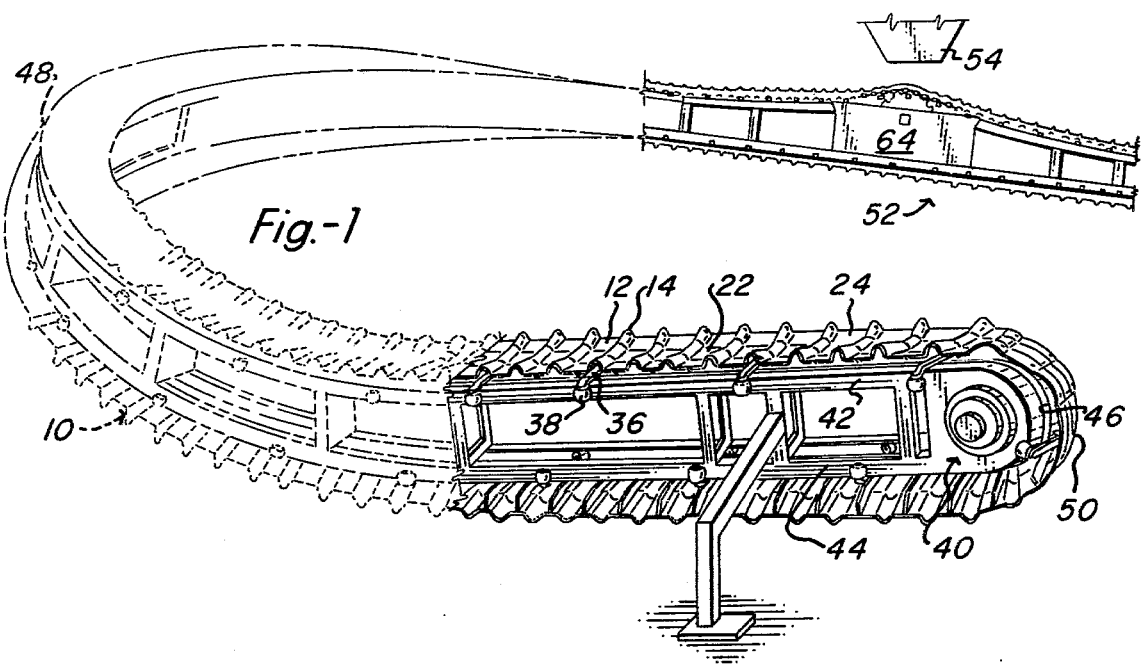
FIG. 1 is a perspective view of a conveyor having the loading station at a point in its length.

With initial reference to FIG 1, the invention will be described in the context of a specific flexible conveyor 10 known in the prior art. This conveyor includes a rubber belt 12 formed with corrugations 14 therein. Although the belt is endless, each corrugation may have an extending flat pan portion 16, FIG. 3, on both front and rear side thereof, which pan portion then terminates in a downwardly extending flange 18. The combination of one corrugation plus the two attached pan portions and flanges constitutes a discrete belt segment, any number of which may be joined together by suitable fasteners 20 to form an entire belt. Not only is the belt divided by laterally extending corrugations 14, but it is also longitudinally dished, having a central neutral area 22 bounded laterally by upwardly and outwardly angled edge areas 24 on both edges. From this description, it will be understood that the belt has many pans bounded on front and rear sides by corrugations and bounded on lateral sides and angled edges. This structure is highly suitable both for straight runs, up-hill and down-hill travel, as well as horizontal curves or curves on hills. The natural tendency of the described structure to dish the load onto the pan surfaces make the belt well suited to handle granular materials.

Figure 3:
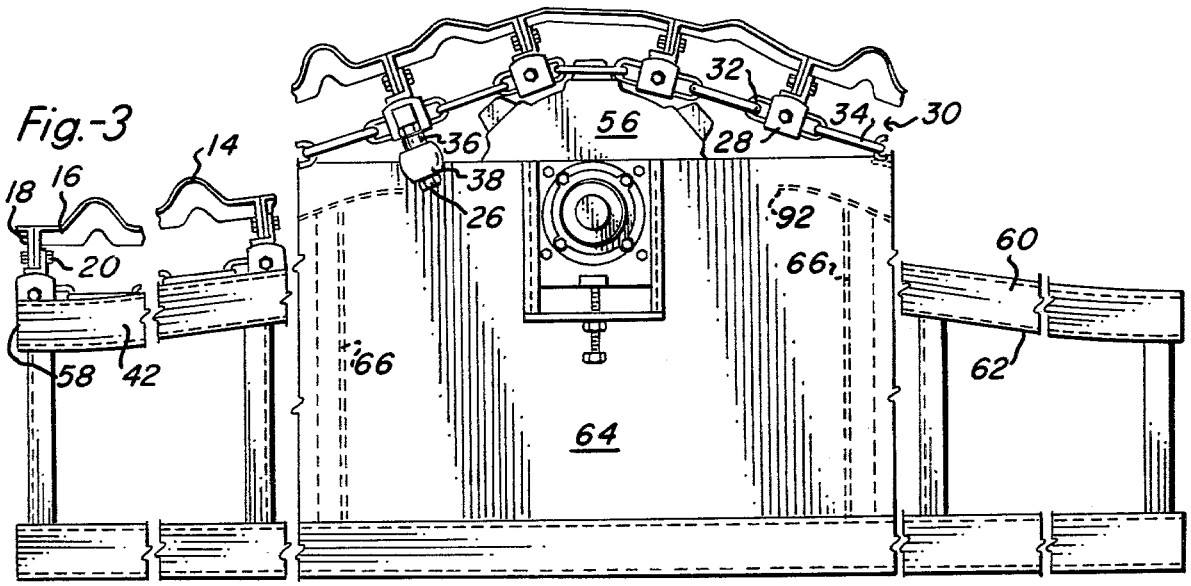
FIG. 3 is a side elevation view of the loading station.

An undercarriage 26, best shown in FIG. 3, supports the belt for its travel over the prescribed path. At the union between adjacent segments, a bracket 28 is attached, for example to fasteners 20, and this bracket is also connected to a link of link chain 30. Every belt segment is two links in length such that the bracket 28 at one end of the segment centrally engages one link 32 of the chain and holds this link in what would normally be a vertical plane or perpendicular to the overlying belt pan. The next chain link 34 underlying the segment is held in a horizontal plane or parallel to the overlying belt, as is well known in chain construction. Finally, a third link 32 is centrally engaged on the opposite end of the segment by another bracket, with the net result that each segment of the belt may be identified with a horizontal link 34 and two halves of vertical links 32. Every fifth bracket has a roller carriage 36 connected to it, and suitable rollers 38 guide the carriage over a track assembly 40.

The track assembly consists of four rails arranged in pairs, the top two rails 42 constituting the upper run of the conveyor and the bottom two rails 44 constituting the lower or return run. At each end of the conveyor the upper and lower runs terminate and a sprocket 46 guides the roller carriages from the upper run rails to the lower run rails. At one end of the conveyor, the sprocket 46 is powered to drive the conveyor. The sprockets interact with the undercarriage to perform their function by engaging the chain links 34, heretofor identified as operating in a plane parallel to the belt. In this manner, the chain pulls the conveyor along whatever path is established by the track assembly. The flexibility of the undercarriage and the corresponding flexibility of the belt allows the conveyor to follow a curved path as indicated in FIG. 1 at 48. The corrugations in the belt stretch or compress as necessary to allow the belt to follow the desired contour, with an extreme case being illustrated at 50 where the belt makes a complete 180 degree reverse at one end of the conveyor, and in so doing the belt becomes almost flat as the corrugations 14 and lateral edges of the pans are stretched almost to flatness.

Various other details of conveyor structure including the configuration of the rails is adequately disclosed in the prior art such as U.S. Pat. No. 3,169,631 to Knappe, which is incorporated by reference herein. It should be noted that the rails typically have a C-shaped cross-section with the open side of the C facing the opposite rail of each respective run. The roller carriages 36 carry two rollers for each of the two rails, one of the rollers operating on an axis parallel to the belt and traveling inside the C-shape of the rail, and the other roller operating on an axis perpendicular to the belt and travelling on the outer wall of the vertical side of the C-shaped track. In this way, the rollers are locked into the track and provide necessary support to the belt regardless of twisting or curving in the rail path.

The described conveyor is adapted to the present invention through creation of a loading station 52 at any desired position along the longitudinal run of the conveyor. Such a station is intended to operate with a dispenser 54 for The material, for example an explosive in granular or flaked form, as may exist. The exact nature of the dispenser is not critical as long as it is able to deliver the granular material at a desired rate and with sufficient accuracy to place the material on the moving belt 12. One example of a suitable dispenser is a hopper with a gravity fed lower outlet. Another example is a conveyor emptying its load onto the present conveyor 10.

Figure 2:
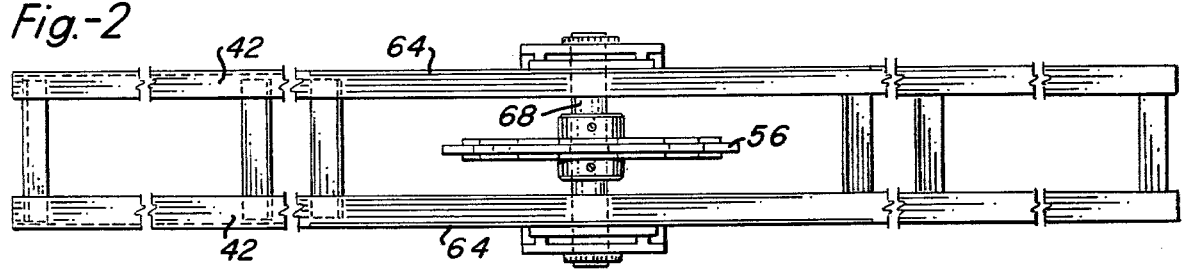
FIG. 2 is a top plan view of the loading station framework, condensed in length by breaking away various intermediate portions thereof.

The loading station includes a hump created in the upper run of the track assembly, wherein the center of the hump is extraordinarily raised by a sprocket wheel 56 that engages the chain links 34 as previously described. With reference now to FIGS. 2 and 3, the two upper run rails 42 begin to depart from parallelism with the lower run rails 44 at the beginning 58 of the loading station, and the rails 42 angle upwardly in the direction of intended belt motion for a distance constituting almost one-half the length of the loading station. As noted above, the rails have a C-shaped cross-section, and a roller operating on an axis parallel to the belt acts inside the rail. As the rails 42 approach the center of the loading station, the top 60 of the C-shaped rail may terminate, while the bottom 62 continues for an additional distance and then also terminates prior to the center of the station. The roller operating inside the C-shaped rail is thus free to be raised above the rail before the rail would reach the mid-point of the station.

The vertical side of the C-shaped rail is replaced by or joined to a support plate 64 that occupies a longitudinal position near the center of the station and is connected to the track assembly in a suitable manner to be firmly supported despite the lack of rails 42 at the mid-point of the station. For example, a plate 64 is attached at each side of the track assembly to existing portions of rails 42 as well as to rails 44 for the entire length of the plate and to braces 66 extending between the upper and lower run rails. Sprocket 56 is carried on shaft 68, which in turn is supported by plates 64 at the mid-point of the station. The highest point of the sprocket raises the belt to its maximum height at the center of the station, after which the belt is returned to engagement with the rails 42 on the second half of the station. The station may be perfectly symmetrical with first half being a mirror image of the second half, so that the station operates in an identical manner regardless of which direction the belt travels.

Figure 4:
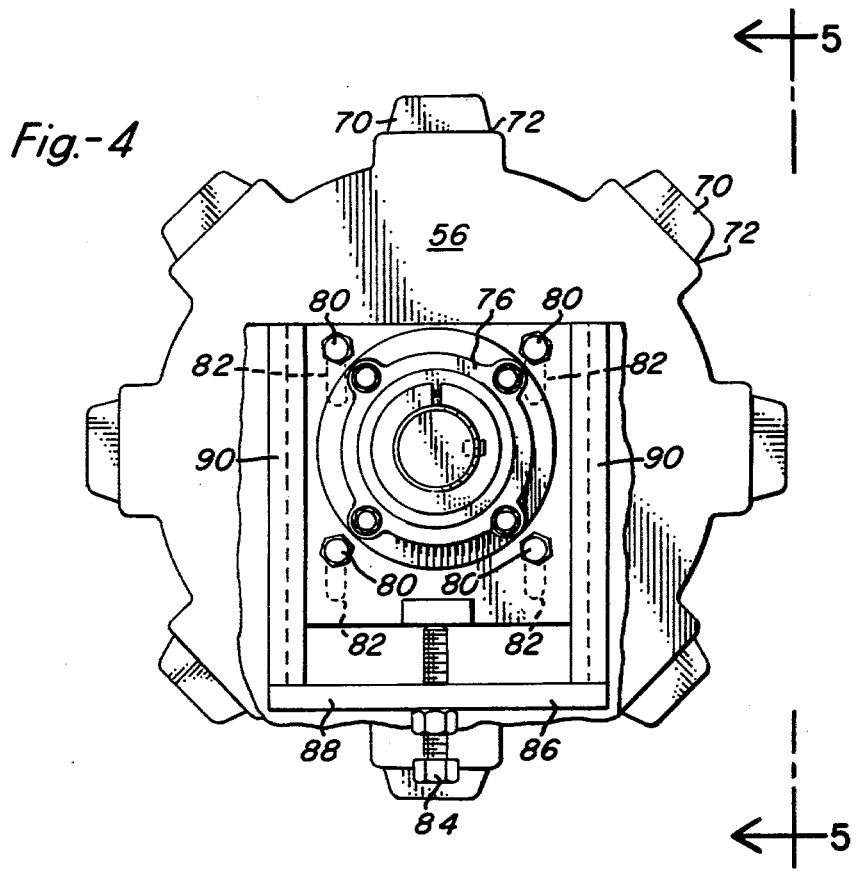
FIG. 4 is a side elevation view of the sprocket wheel located at the loading station.
Figure 6:
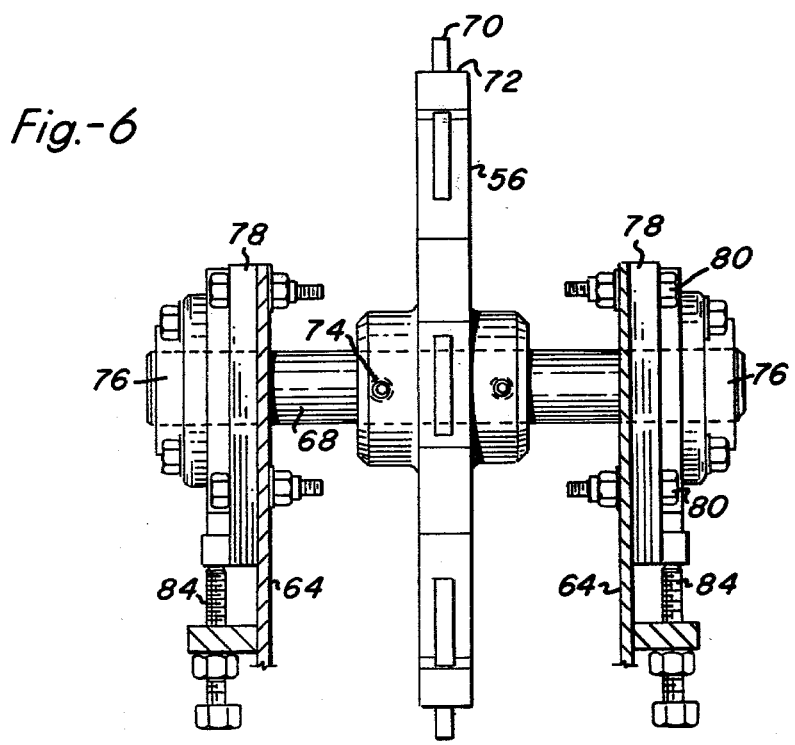

With reference now to FIGS. 4 and 5, the sprocket 56 is equipped with teeth 70 adapted to be engaged in the chain links 34. Each tooth 70 has a shoulder 72 that contacts the chain link 34 and limits the engagement between the link and the tooth. The sprocket is joined to rotate with shaft 68, for example by set screws 74 entering suitable recesses in the shaft, and the shaft in turn is mounted in bearings 76, which are carried on adjustment plate 78. The sprocket height relative to rails 42 and plate 64 is adjustable by raising or lowering plates 78, each of which is held at the desired height by suitable fasteners such as bolts 80, each of which extends through a vertical slot 82 in support plate 64. A mechanical adjusting device such as bolt 84 is threadedly connected to plate 64 on the mounting frame 86 for plate 78, and this bolt enables the sprocket height to be accurately controlled. The mounting frame is generally U-shaped with bottom member 88 and twin side members 90. The frame is attached to plate 64 and contains suitable grooves between the side members 90 and plate 64 to contain and guide adjusting plate 78. Similar arrangements for supporting and adjusting sprockets are known in the art. Shaft 68 passes through a suitably sized cut-away portion of plate 64 to move freely with the movement of the adjusting plate.

Referring again to FIGS. 2 and 3, if the direction of belt travel is from right to left, the rails 42 on the left side of the figures are the lead-in track, while the rails on the right side are the lead-out track. The entire loading station may have a longitudinal dimension of approximately 11 feet, 10 inches. Each rail 42 may be smoothly curved upwardly from the plane of track outside the loading station toward the center of the loading station in an arc having a lead-in radius, for example of eleven feet, two inches. The terminal end 92 of each rail facing the sprocket may deviate from the established arc of the rail with a slight reverse bend approaching level. As noted above, such terminal end is the lower wall of the C-shaped rail, and on the lead-in track the roller acting on this wall will be lifted from the end 92 prior to the time the roller would otherwise run off the end of the track. On the lead-out track, the roller acting on the lower wall of the rails may first strike the wall and then be guided back into the C-shaped rails.

The sprocket 56 lifts the belt and undercarriage more abruptly than is feasible, as a practical matter, purely by imparting curvature to the tracks. The design of the tracks and the design of the sprocket can be altered for different belts with different corrugation heights. For belts having each crossfold about 1½ inches high, it is desired that the sprocket have a pitch diameter of 20.19 and eight teeth. The axis of shaft 68 may be adjusted to a maximum height of track end 92, at which point the sprocket will cause the belt to be stretched to 100 percent of flattening the corrugations. At slightly lower adjustment, the sprocket may cause only 95 percent of stretching to flatness, with the result that the corrugations may remain, for example, one-half inch high. It should also be noted that, when the belt is stretched to 95 percent of flatness, the belt forms an included angle of from 120 degrees to 135 degrees as it passes over the sprocket. The greatest stretching occurs when two teeth 70 have engaged links 34, and the crossfold between the links is then stretched as it passes over the top of the sprocket. As many as three teeth may have simultaneous contact with the chain when the sprocket is at its highest adjustment.

In operation, the conveyor belt is driven by one sprocket, such as an end sprocket driving the chain. As the belt passes over the loading station the crossfolds are increasingly stretched until the maximum stretching, and correspondent maximum flattening, at the apex of the sprocket. At the apex, the dispenser deposits a measured quantity of material to be carried on the belt. As the belt passes beyond the apex, the stretching decreases and the degree of flattening similarly decreases, resulting in the crossfolds returning to their prior height, for example 1½ inches. Where the carried material is granular explosive or the like, the material naturally tends to shift off of the rising crossfold and to settle into the compartment between crossfolds.

As the belt is performing as described above, the undercarriage is first guided through rails 42 of the lead-in track, until the influence of the sprocket 56 lifts the rollers out of the inside of the rails. On the lead-out side of the loading station, the rollers again engage the rails. Since the belt is under constant tension while passing over the sprocket, the height of the sprocket can be precisely adjusted for the rollers to smoothly exit from and enter the rails.

The loading station may be employed with varying degrees of efficiency in portions of the conveyor with either level or non-level attitudes. It is preferred that the run immediately following the station be horizontal so that the crossfolds will return to at least original height. Of course, if the run following the station should curve upwardly, the crossfolds may be temporarily compressed to greater than original height. On various angled runs, the station will operate, but the angle of repose and the surcharge angle of the material being loaded must be taken into account to assure that the rising crossfolds will separate the material into the various compartments on the belt surface.

It will therefore be understood that the invention may be applied to a variety of conveyor configurations having a longitudinal nature, although the invention does not find application to an end-of-run sprocket at which the belt reverses direction by 180 degrees, since in this case gravity is defied to retain the material on the belt until the crossfolds can be raised.

The dispenser 54, as stated previously, may be of a kind known in the prior art. One such dispenser is a hopper with a diaphragm valve on the lower end. The valve consists of an outer pipe with an inner pipe-like inflatable bladder. Air is injected between the outer pipe and the bladder to swell the bladder as required to constrict flow through the pipe. The constant discharge of granular material through the diaphragm valve is thus precisely adjustable to prevent excess material from being deposited on the belt. It is anticipated that the output of the diaphragm valve may be coupled with the conveyor speed. The location of the dispenser with respect to the hump may have reasonable latitude, in that the loading may take place exactly at the apex or slightly to either side. Loading slightly in advance of the apex is preferred in many instances.

I claim:

1. A conveyor loading station for use in combination with dispensing means placing material on the conveyor, wherein the conveyor is of the type having a flexible belt moving in a longitudinal direction and having transversely extending physical relief structure on the upper surface thereof when the belt is subjected to a first degree of tension, wherein the belt is resiliently stretchable when placed under a second and greater degree of tension to substantially reduce the elevation of said relief structure, comprising a humped section located in a longitudinal run of the conveyor, wherein said humped section has a lead-in portion leading upwardly from the plane of the longitudinal run to an apex, and a lead-out section leading downwardly to the plane of the longitudinal run from the apex, said apex having sufficient angularity to place said belt under the second degree of tension while passing over the apex.

2. The conveyor loading station of claim 1, wherein said humped section further comprises roller means located between said lead-in and lead-out portions for raising and guiding the belt through the apex.

3. The conveyor loading station of claim 1, wherein said conveyor is of the type having a belt mounted on a link chain, wherein said humped section further comprises a height-adjustable sprocket between the lead-in and lead-out portions having teeth adapted to engage links of said chain and carry the chain and attached belt over the apex.

4. The conveyor loading station of claim 3, wherein said conveyor is of the type having roller carriages connected to said link chain and having rollers on the carriages, and wherein the rollers are guided within tracks having rails with C-shaped cross-section, the lead-in section further comprising an upwardly curving length of said rails discontinuing the top wall of said C-shaped cross-section prior to the position of said sprocket for allowing the rollers to be raised from the rails.

5. The conveyor loading station of claim 4, wherein said sprocket further comprises adjusting means for setting a desired vertical height of the sprocket relative to said lead-in and lead-out sections.

6. The method of loading a granular material from a constantly discharging source of supply onto a continuously moving belt travelling in a longitudinal path, wherein the belt is of the kind having transversely oriented, elevated relief structure on the upper surface thereof defining separations between adjoining sections of the conveyor belt surface, and the belt is stretchable under tension to reduce the elevation of the relief structures, comprising:
 (a) upwardly directing the belt from said longitudinal path on the inclined side of a hump;
 (b) stretching said belt over the apex of the hump to locally tension the belt and reduce the elevation of the relief structures;
 (c) discharging the granular material onto the belt near the apex;
 (d) downwardly directing the loaded belt from the apex on the declined side of the hump to the longitudinal belt path to reduce the local tension of the belt and restore the elevation of the relief structure, the restored relief structures separating the granular material onto separate sections of the belt.

7. The method of claim 6, wherein
 (a) said upwardly directing step further comprises guiding the belt in a track defining the inclined side of the hump;
 (b) the step of stretching the belt over the apex further comprises passing the belt over a sprocket elevated above said track; and
 (c) said downwardly direction step further comprises guiding the belt in a track defining the declined side of the hump.

8. The method of claim 7, wherein said relief structures are reduced substantially to flatness when the belt is stretched one hundred percent of its available stretch length, and wherein said sprocket tensions the belt to at least ninety-five percent of available stretch length.

9. The method of claim 8 wherein said sprocket engages the belt over an included angle of between 120 degrees and 135 degrees.

* * * * *